United States Patent
Racape et al.

(10) Patent No.: US 12,556,720 B2
(45) Date of Patent: Feb. 17, 2026

(54) LEARNED VIDEO COMPRESSION AND CONNECTORS FOR MULTIPLE MACHINE TASKS

(71) Applicant: INTERDIGITAL VC HOLDINGS, INC., Wilmington, DE (US)

(72) Inventors: Fabien Racape, San Francisco, CA (US); Lahiru Dulanjana Hewa Gamage, Davis, CA (US); Jean Begaint, Menlo Park, CA (US); Simon Feltman, Sunnyvale, CA (US)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 48 days.

(21) Appl. No.: 18/033,697

(22) PCT Filed: Nov. 3, 2021

(86) PCT No.: PCT/US2021/057862
§ 371 (c)(1),
(2) Date: Apr. 25, 2023

(87) PCT Pub. No.: WO2022/098731
PCT Pub. Date: May 12, 2022

(65) Prior Publication Data
US 2023/0370622 A1  Nov. 16, 2023

Related U.S. Application Data

(60) Provisional application No. 63/109,498, filed on Nov. 4, 2020.

(51) Int. Cl.
H04N 19/186 (2014.01)
H04N 19/176 (2014.01)
H04N 19/60 (2014.01)

(52) U.S. Cl.
CPC ......... *H04N 19/186* (2014.11); *H04N 19/176* (2014.11); *H04N 19/60* (2014.11)

(58) Field of Classification Search
CPC ...... H04N 19/60; H04N 19/186; H04N 19/50; H04N 19/176; G06N 3/084; G06N 3/045; G06N 3/047
(Continued)

(56) References Cited

U.S. PATENT DOCUMENTS

2019/0273948 A1* 9/2019 Yin .................. G06N 3/045
2020/0151559 A1* 5/2020 Karras .............. G06N 3/045
(Continued)

FOREIGN PATENT DOCUMENTS

EP  3706046  9/2020

OTHER PUBLICATIONS

Minnen et al., Joint Autoregressive and Hierarchical Priors for Learned Image Compression, Advances in Neural Information Processing Systems 31, arXiv:1809.02736v1 (cs.CV), pp. 1-22, Sep. 8, 2018.
(Continued)

*Primary Examiner* — Thai Q Tran
*Assistant Examiner* — Nienru Yang
(74) *Attorney, Agent, or Firm* — Ronald Kolczynski

(57) ABSTRACT

A processing module, or connector, adapts an output of a codec, or a decoded output, to a form suitable for an alternate task. In one embodiment, the output of a codec is used for a machine task and the connector adapts this output to a form suitable for a video display. In another embodiment, metadata accompanies the codec output, which can instruct the connector how to adapt the codec output for an alternate task. In other embodiments, the processing module performs averaging over a N×M window, or convolution.

21 Claims, 11 Drawing Sheets

(58) Field of Classification Search
USPC .......................................................... 386/353
See application file for complete search history.

(56) References Cited

U.S. PATENT DOCUMENTS

| 2020/0196024 | A1* | 6/2020 | Hwang | H04N 21/2353 |
| 2020/0304802 | A1* | 9/2020 | Habibian | H04N 19/124 |
| 2020/0327702 | A1* | 10/2020 | Wang | H04N 19/102 |

OTHER PUBLICATIONS

Liu, et al., DSIC: Deep Stereo Image Compression, Arxiv.org, Cornell University Library, 201 Olin Library Cornell University Ithaca, NY 14853, Aug. 9, 2019.
Balle, et al., Variational Image Compression with a Scale Hyperprior, ArXiv180201436 Cs Eess Math, May 2018,.
Chen et al., CNN Feature Coding for Cloud-Based Visual Analysis, 129. MPEG Meeting, Jan. 13, 2020-Jan. 17, 2020, Brussels, (Motion Picture Expert Group or ISO/IEC JTC1/SC29/WG11), No. m52162, Jan. 7, 2020.

* cited by examiner

LEARNED VIDEO COMPRESSION AND CONNECTORS FOR MULTIPLE MACHINE TASKS

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

At least one of the present embodiments generally relates to a method or an apparatus for video encoding or decoding, and more particularly, to a method or an apparatus for using template matching prediction in combination with other coding tools, as in the VVC (Versatile Video Coding or H.266) standard.

According to a first aspect, there is provided a method. The method comprises steps for coding a video portion using a first set of constraints to generate a bitstream; decoding the bitstream; processing the decoded bitstream under a second set of constraints; and performing a task with the processed bitstream.

According to a second aspect, there is provided another method. The method comprises steps for decoding a video bitstream; and processing the decoded video bitstream wherein said processing adapts the decoded video bitstream for a subsequent task.

According to another aspect, there is provided an apparatus. The apparatus comprises a processor. The processor can be configured to execute any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

The embodiments described here are in the field of video compression and decompression and video encoding and decoding generally and more specifically in the context of the compression of images and videos for machine tasks, also called video coding for machines. The proposed methods can apply to images and videos. In the following, the term "video" is used and can be interchanged by "image" as images represent a subset of a video content.

In the domain of video transmission, traditional compression standards can reach low bitrates by transforming and degrading the videos based on signal fidelity or visual quality. However, an increasing number of videos is now "viewed" by machines rather than humans, by typically involving algorithms based on neural networks. Optimizing existing video encoders directly for machine consumption is not trivial because of their handcrafted coding tools.

A new standardization group at ISO/MPEG is studying the evidence of the need of a standard for transmitting/storing bitstreams which contain the necessary information for performing different tasks at the receiver, such as segmentation, detection, object tracking, etc.

In recent years, novel image and video compression methods based on neural networks have been developed. These methods are also called end-to-end deep-learning-based methods. The parameters of the model transforming the input content into a compressed representation and reconstructing it are obtained from examples data. The neural networks parameters are learned during training by iteratively minimizing a loss function. In a compression case, the loss function describes both an estimation of the bitrate of the encoded bitstream, and the performance of the decoded content on the targeted task. Traditionally the quality of the reconstructed image is optimized, for example based on the measure of the signal distortion or an approximation of the human-perceived visual quality. For machine-based tasks, the distortion term can be modified to integrate the accuracy of a given machine task (or any measure of a task performance) on the reconstructed output.

Figure 1:
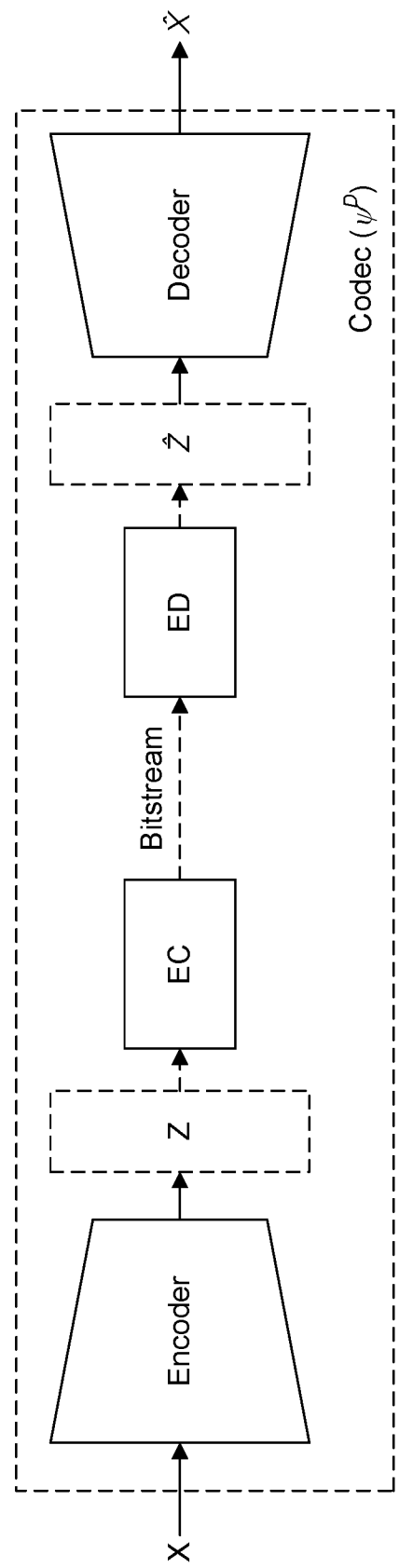
FIG. 1 illustrates a basic auto-encoder chain.

FIG. 1 shows an exemplary end-to-end compression system. The input X to the encoder part of the network can consists of
- an image or frame of a video,
- a part of an image
- a tensor representing a group of images
- a tensor representing a part (crop) of a group of images.

In each case, the input can have one or multiple components, e.g.: monochrome, RGB or YCbCr components.

1. The input tensor X is fed into the encoder network. The encoder network is usually a sequence of convolutional layers with activation functions. Large strides in the convolutions or space-to-depth (Reshaping and permutation, for example a tensor of size (N, H, W) is reshaped and permuted to (N*2*2, H//2, W//2)) operations can be used to reduce the spatial resolution while increasing the number of channels. The encoder network can be seen as a learned transform.
2. The output of the encoder network, the "features map" or "latent" Z, is quantized and entropy coded (EC) as a binary stream (bitstream) for storage or transmission.
3. The bitstream is entropy decoded (ED) to obtain $\hat{Z}$, the quantized version of Z.
4. The decoder network generates $\hat{X}$, an approximation of the original X tensor from the latent $\hat{Z}$. The decoder network is usually a sequence of up-sampling convolutions (e.g.: "deconvolutions" or convolutions followed by upsampling filters) or depth-to-space operations. The decoder network can be seen as a learned inverse transform, or a denoising and generative transform.

The encoder network is usually composed of a sequence of convolutional layers with stride, allowing to reduce the spatial resolution of the input while increasing the depth, i.e.: the number of channels of the input. Squeeze operations can also be used instead of stride convolutional layers (space-to-depth via reshaping and permutations). The encoder network can be seen as a learned transform.

The output of the analysis, which consists of a tensor is sometimes referred as the latent or feature maps. The latent is quantized and entropy coded for storage/transmission, depicted as the (EC) block in FIG. 1. The bitstream, i.e.: the set of coded syntax elements and payloads of bins representing the quantized symbols, transmitted to the decoder.

The decoder:
Coded quantized symbols are first decoded (ED) from the bitstream
then the decoded latent tensor to a set of layers usually composed of (de-)convolutional layers (or depth-to-space squeeze operations) to synthesize the output frames. The decoder network is thus a learned inverse transform operating on quantized coefficients.

The output of the decoder is the reconstructed image or a group of images $\hat{X}$.

Note that more sophisticated architectures exist, for example adding a "hyper-autoencoder" (hyper-prior) to the network in order to jointly learn the latent distribution properties of the encoder output. The general aspects described are not limited to the use of autoencoders. Any end-to-end differentiable codec can be considered.

In current approaches, such DNN-based autoencoders can be trained using several types of losses:
Losses targeting high video quality for human viewing:
"objective" metrics, typically Mean Squared Error (MSE) or based on structural similarity (SSIM/MS-SSIM). The results may not be perceptually as good as the second type, but the fidelity to the original signal (image) is higher.
"subjective" metrics (or subjective by proxy), typically using Generative Adversarial Networks (GANs) during the training stage or advanced visual metric via a learned neural network proxy.
Losses targeting high accuracy for machine tasks. In that case, the algorithm used for the machine task is used jointly with the auto-encoder to provide a final task output such as objects bounding box, the classification of objects or their tracking over the frames of videos.

Figure 2:
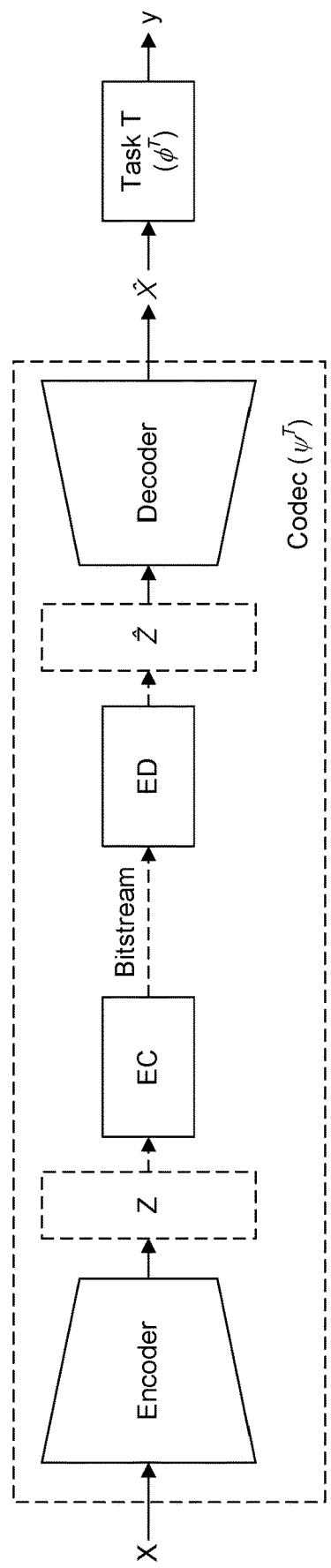
FIG. 2 illustrates an example framework including an autoencoder for image/video compression, coupled with a machine task which is run on the decoded pictures.

The latter case can rely on a framework as shown in FIG. 2. The advantage of using a learnable auto-encoder instead of a traditional codec is that the parameters of both the autoencoder and the algorithm can be optimized (jointly) with respect to specific tasks. If the graph (a graph fully describes a neural network: the operations, their orders, the parameters (or weights) values) of the task algorithm is known, the gradients at each training step can be backpropagated from the measured accuracy to the analysis part of the autoencoder. Without backpropagation the neural network cannot be trained.

In FIG. 2, a chain including a compression framework and a machine task algorithm is shown. The captured source video X is encoded into a bitstream. In the exemplary autoencoder depicted in FIG. 2, the compression relies on transforms based on convolutional layers that produce a latent representation Z, which is then entropy coded using an arithmetic encoder. At the decoder mirror operations enable to decode the symbols of the bitstream to produce a decoded video $\hat{X}$. The latter is the input of the machine task T which outputs a prediction y. For instance, in image classification y is the estimated class label.

Call the parameters of the codec and the task algorithm $\psi^T$ and $\phi^T$, respectively, to mark the fact that they are jointly (end-to-end) trained for the task T.

The described embodiments aim at solving the problem of optimizing a chain consisting of an end-to-end learned codec, e.g. auto-encoder, and a machine task while keeping the decoded images and videos usable for other tasks and viewing.

State-of-the-art learned approaches for image/video compression are usually trained for the viewing of decoded videos. As the compression is usually lossy, the codec has to make decisions on how to degrade the content, while keeping an acceptable video at a given target bitrate. This optimization is based on minimizing a loss which consists of a weighted combination the bitrate and a score given by a quality metric. In the case of basic video compression for viewing, the metric can be a classical fidelity metric, such as the Mean Squared Error (MSE), or other metrics considering the Human Video System to assess the quality of the decoded content. The resulting decoded content may then contain compression artifacts that are well tolerated by human eyes.

However, a machine task running on the same decoded content may show poor results. An object classifier/detector and the human vision do not share the same features for assessing the quality of decoded pictures. That is why, in the case of a differentiable chain {codec+task algorithm}, the codec can be trained or fine-tuned for specific tasks. The output decoded frames that are optimized to contain the information that the machine task needs as input. For instance, high frequency edges might be kept while colors are distorted if they are not important in an object tracker scenario. However, a classifier might require a precise color information for distinguishing between two classes of objects.

Figure 3:
FIG. 3 shows different artifacts at the same bitrate using two different codecs.
Figure 3:
Figure 3:
Figure 3:

FIG. 3 clearly shows the different artifacts that one obtains when using the same codec architecture: scale-hyperprior, operating at similar bitrates, but trained for image fidelity (top row) and object detection (bottom row).

In the case where the system needs to be used for multiple tasks, which may include viewing by humans, the described embodiments introduce a step, or connector, which transforms the decoded content (bottom row of FIG. 3) from the autoencoder trained for a specific main task to fit any secondary tasks or viewing needs.

This is particularly useful in the context of video coding for machines where some use case requires a high-performance detection, while the decoded content can be used for another task. For example, in the case of video-surveillance, the system needs a high accuracy in classifying different actions and triggering the monitoring. Using such optimized coding may however introduce artifacts that affect viewing the video, which is also a required feature, when the machine has detected something, and the validation or later control is performed by a human, requiring to store this version of the video.

Machine tasks such as object detection, image classification, segmentation, etc. are usually trained on large datasets of images/videos that are already compressed using traditional codecs.

Current end-to-end compression networks usually train a unique network, either for an objective metric (typically MSE/PSNR), or using a perceptual metric, for visual consumption.

The system can be jointly trained end-to-end, provided that the graphs of both codec and task are known.

The inference accuracy can be calculated by considering the difference between the estimated label y and the ground truth label $y_{gt}$ for each X.

In general, the initial parameters $\phi^T$ are optimized to obtain a minimum task loss, trained on uncompressed images, or compressed at high quality. Similarly, the codec parameters $\psi$ can be optimized to produce decoded videos with the highest fidelity to the source or viewing quality under a bitrate constraint.

It is possible to jointly retrain (also called fine-tuning) from the initial sets of parameters, the whole chain so that the system produces output predictions y at an optimal accuracy under the constrain of a target bitstream size.

The system is now optimized for a given Task T, which is considered to be the main task the models are trained for. However, there exist use cases where the system must also produce satisfactory for secondary tasks. To our knowledge the adaptation of the decoded content to side tasks, using connectors described in the next sections, is a novel feature in this context.

The described embodiments propose to introduce connectors to the output a decoder when the of decoded videos are expected to be used for another task. FIG. 3 shows the proposed framework in which a connector C is added to the output of the codec optimized for task T, to adapt the decoded content to a secondary task S. Denote $\psi_\beta^T$ the set of parameters of the codec that is optimized for the machine task T under a bitrate constraint b. Note that task S can correspond to display, in which case, the output of the system is a reconstructed video output by C.

Embodiments specifying connector algorithms are detailed in the following sections.

The general aspects described apply to a video decoder, as they involve modifications at the receiver, that could be part of a VCM decoder. They could also be placed out of the scope of decoding, as post-processing, depending on future standard activities. Some syntax elements can be envisioned to embed side information on the use of the proposed connectors.

In the following subsections, several embodiments are proposed in which the connectors consist of different functions. In most cases, the considered tasks S were trained on videos and thus take videos as input. The connector C then corresponds to a filtering function which takes videos as both input and output.

There are several types of example connectors, as described below.

Average Pooling

Average pooling consists, for each color component, in averaging the pixel values over an N×M window centered at each pixel location. A typical window size is 3×3. This operation does not require any trained parameters stored at the decoding end. Average pooling will filter the images and smooth any high frequency artifacts that could appear when encoding pictures for a specific task. Average pooling would for instance help adapting the content to machine tasks such as classification, which might be sensitive to high frequency types of artifacts.

2D Convolutions 2D convolutions also consider an N×M×3 window at each pixel location, in the case of RGB images for instance. Instead of averaging the values for each location, 2D-convolutions calculate a weighted sum of those values. Hence, contrary to average pooling, convolutions contain trainable weights. For example, the weights can be trained optimizing the following function:

$$c_\beta = \operatorname*{argmin}_c \{\mathcal{L}_\mathcal{D}(x, \hat{x}_\beta^C)\}$$

where the loss $\mathcal{L}_\mathcal{D}$ can be based on any metric that evaluates the output content from the connector $\hat{x}_\beta^C$ to the source content x. $\beta$ still represents a parameter that drives the tradeoff between bitrate and accuracy for task T. In other words, we try to make the output of the connector closer to the source. When training on numerous examples, this will tend to generate a filter making the images more "generic" to be used for viewing or used as input for other tasks.

Figure 4:
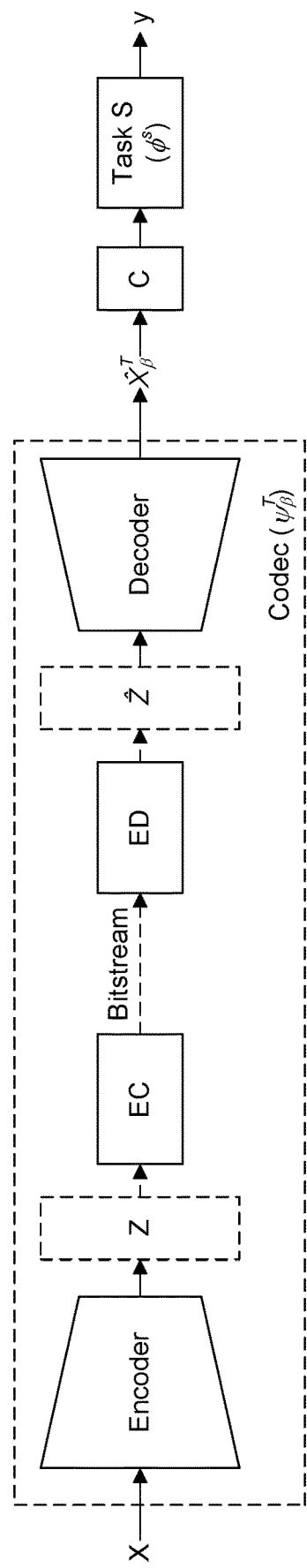
FIG. 4 shows an example of one proposed connector.

FIG. 4 shows the performance of adding such connectors in a use case where the primary task is object detection, and the secondary task is image classification.

Figure 5:
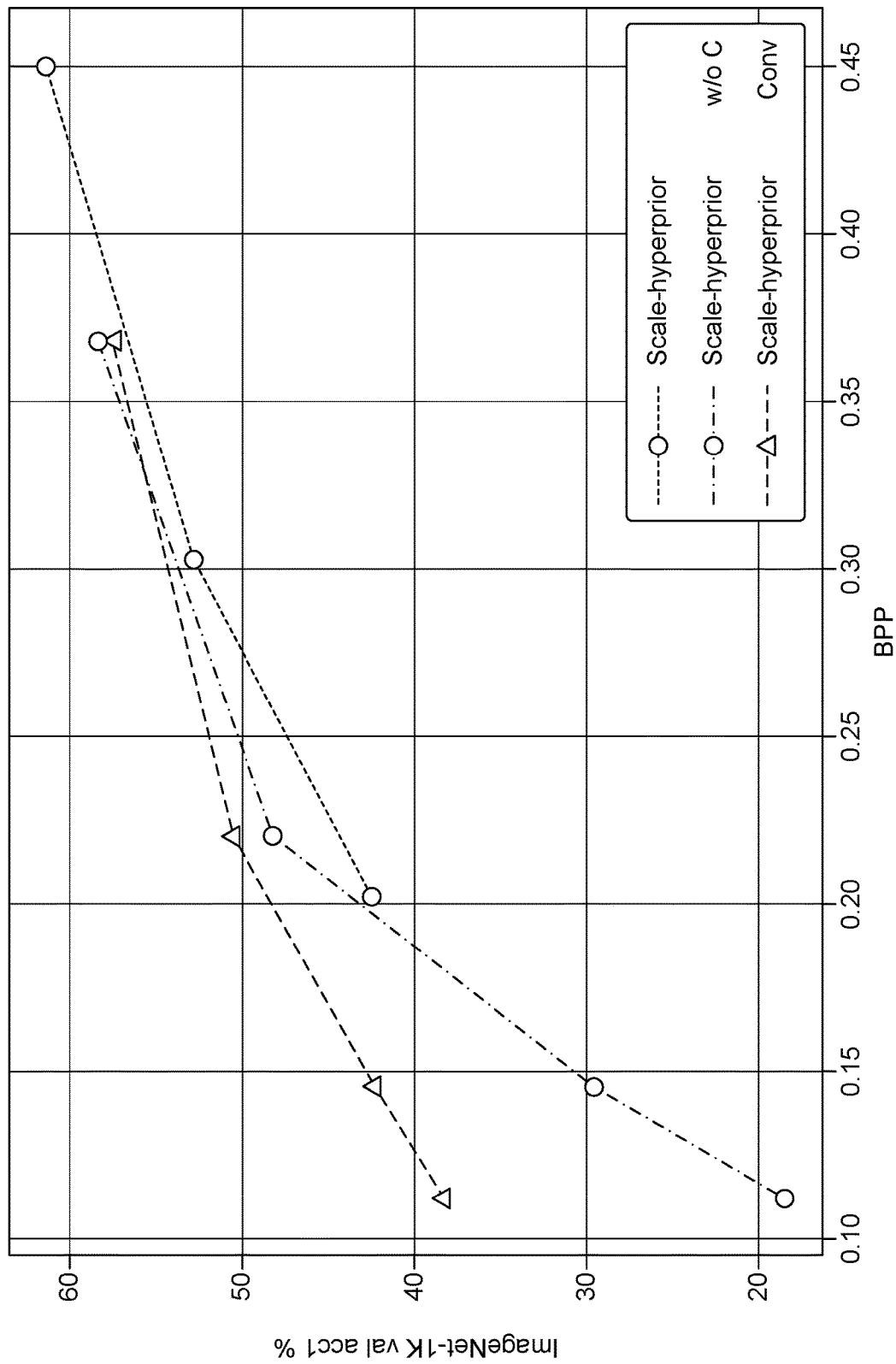
FIG. 5 shows accuracy of secondary task image classification as a function of the bitrate.

In particular, the initial codec consists of the Scale-Hyperprior architecture, trained for high fidelity image compression. It is trained for object detection on the MSCoco dataset, jointly with the task algorithm Faster-R-CNN to provide an optimal trade-off between bitrate and object detection accuracy. Then, the second task consists in classifying images, its accuracy is evaluated by classifying the images of the Imagenet-1k validation set. FIG. 5 shows the classification accuracy for 3 different settings:

- Using the initial parameters of the codec for high fidelity image compression. This would correspond to taking on-the-shelf state-of-the-art codecs, optimized for viewing. This is referred to as scale-hyperprior.
- Using the parameters of the codec optimized for object detection, we called it task T in the description. This corresponds to having a codec optimized for a primary task and reusing it directly for other tasks. This is referred to as scale-hyperprior w/o C, i.e. retraining of the codec's parameter and using the task algorithm without connectors.
- Same as above, i.e. codec optimized for object detection, but inserting a connector C that consists of a 2D convolution with a N×N×3 kernel in the case of 3-component images (scale-hyperprior Conv). Note that the described embodiments are not limited to three components, whatever shape of decoded frames and input of the task algorithm can be considered.

FIG. 5 clearly shows the advantage of the connector, in particular at low bitrate, measured in Bits Per Pixel (BPP). The accuracy of the proposed method is higher than directly reusing the codec optimized for task T (object detection)

Note that in the presented example, the weights of the connector are trained using a loss minimizing the errors between the decoded frames and the source. This enables a system to have a low-complexity step to "de-specialize" decoded videos from a task specific codec. This is a useful feature in a context where the accuracy of the primary task is essential, but the decoded pictures need to produce satisfactory results for other tasks or for viewing.

2D Depth-Wise Convolutions

Similar to 2D convolutions, depth-wise convolutions operate on the color channels separately. This require 3 times less parameters compared to 2D convolutions. Training optimizes the same loss function as in 2D convolutions.

As for standardization, there is an activity around Video Coding for Machines (VCM) that was established at ISO/MPEG to develop a standard for video feature compression for multiple machine tasks.

In the case of the need for a reconfigurable codec, i.e. encoder+decoder, that is optimized for a specific task in particular, but should be able to produce content that can be reused for other tasks or for viewing, such architecture can be envisioned.

If a decoder contains the proposed connectors in its scope, the described embodiments are easily detectable.

The connector could also be viewed as a post-processing of the decoder. In that case, metadata can be transmitted with the bitstream to signal the need for using a connector and in this case which type. If the connector contains trained parameters, these parameters could also be transmitted and refreshed at the decoder.

Ecosystems involving video coding and decoding, in particular when coupled with machine tasks, e.g. object detection, segmentation, etc. could employ the described embodiments, such as those implementing a standard on Video Coding for Machines (VCM).

The proposed methods can be implemented at receiving devices and decoders. They could be either in the scope of decoding or as post-processing. In that case, side-information (SEI) can also be envisioned to convey information on the potential use of the proposed connectors.

Figure 6:
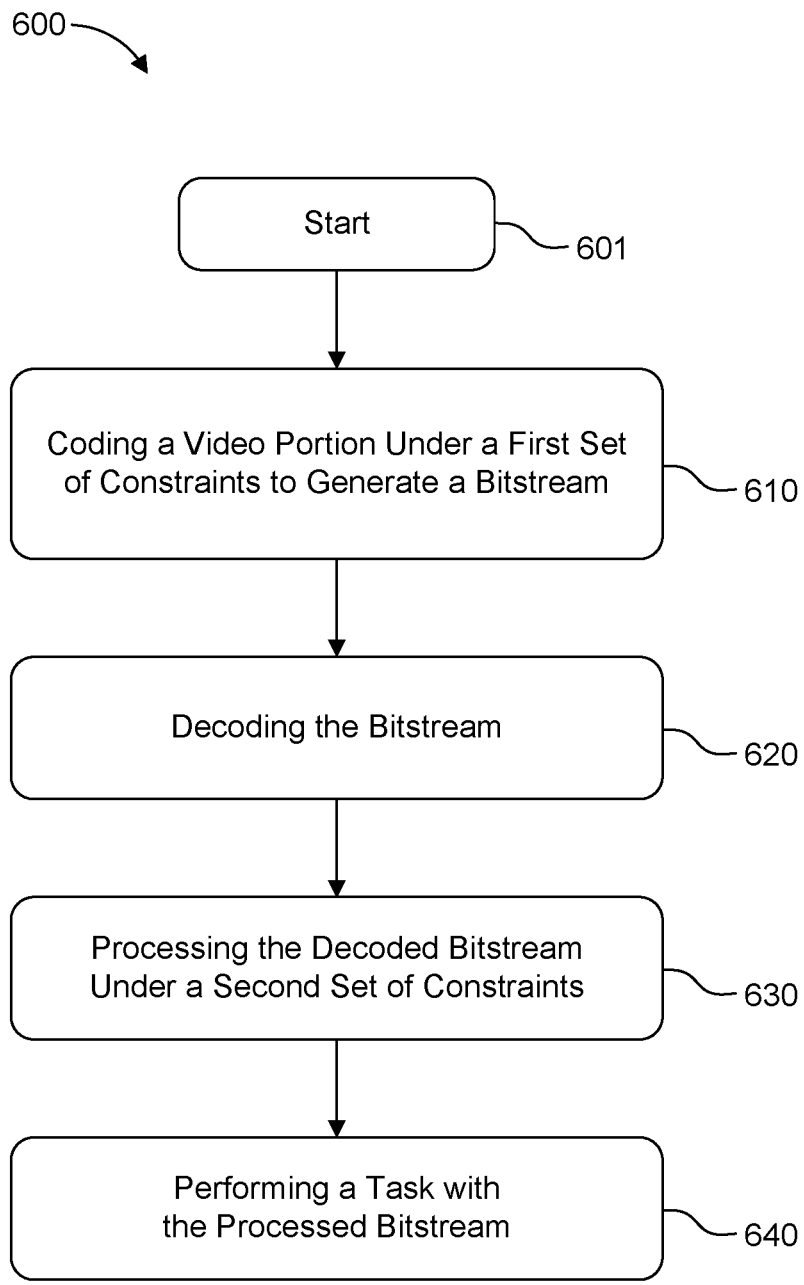
FIG. 6 shows one embodiment of a method under the general described aspects.

One embodiment of a method 600 under the general aspects described here is shown in FIG. 6. The method commences at start block 601 and control proceeds to block 610 for coding a video portion under a first set of constraints to generate a bitstream. Control proceeds from block 610 to block 620 for decoding the bitstream. Control proceeds from block 620 to block 630 for processing the decoded bitstream under a second set of constraints. Control then proceeds from block 630 to block 640 for performing a task with the processed bitstream.

Figure 7:
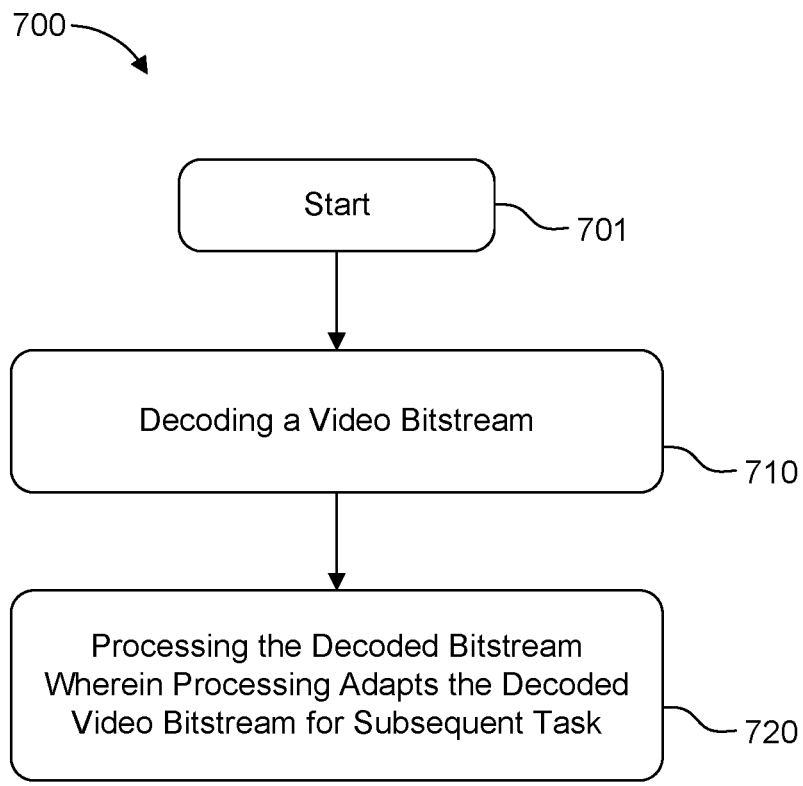
FIG. 7 shows another embodiment of a method under the general described aspects.

One embodiment of a method 700 under the general aspects described here is shown in FIG. 7. The method commences at start block 701 and control proceeds to block 710 for decoding a video bitstream. Control proceeds from block 710 to block 720 for processing the decoded bitstream wherein processing adapts the decoded video bitstream for a subsequent task.

Figure 8:
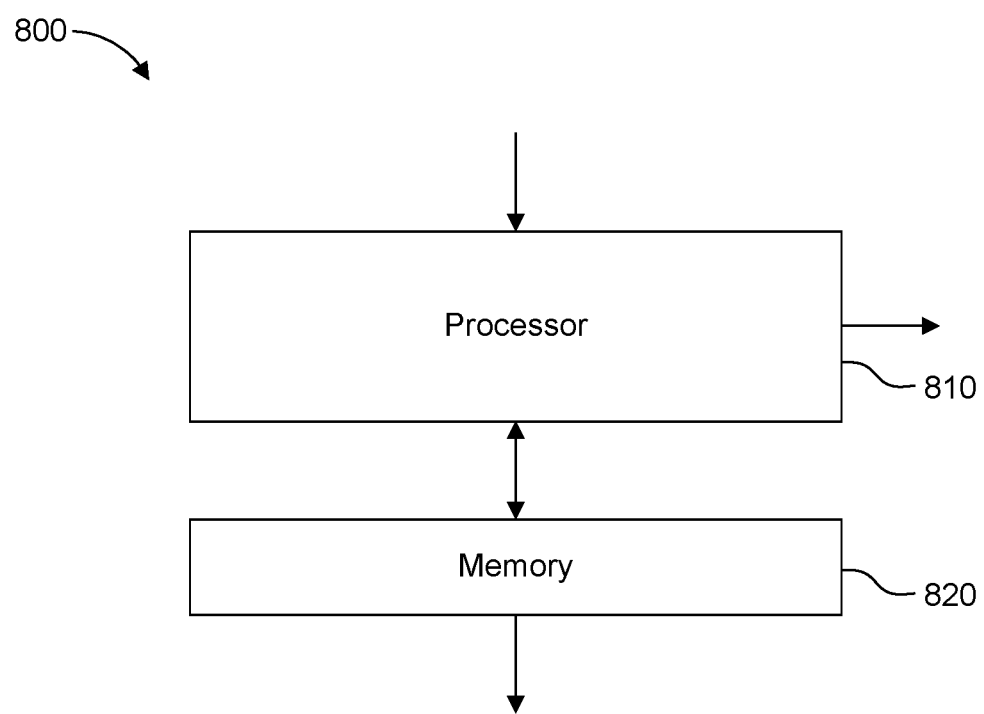
FIG. 8 shows an example apparatus under the described aspects.

FIG. 8 shows one embodiment of an apparatus 800 implementing the methods of FIG. 6 or FIG. 7. The apparatus comprises Processor 810 and can be interconnected to a memory 820 through at least one port. Both Processor 810 and memory 820 can also have one or more additional interconnections to external connections.

Processor 810 is also configured to either insert or receive information in a bitstream and, either compressing, encoding, or decoding using any of the described aspects.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 9:
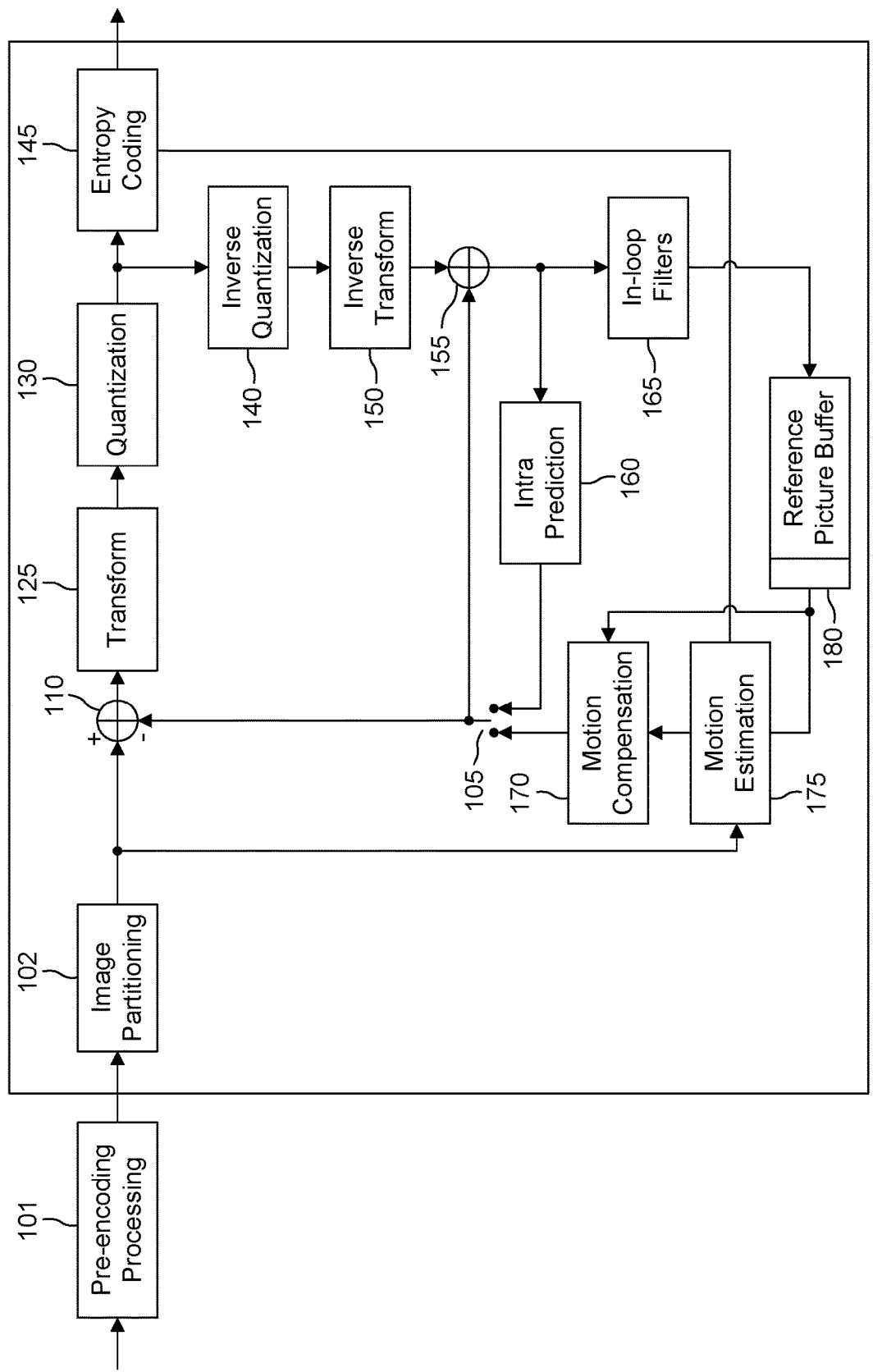
FIG. 9 shows a standard, generic video compression scheme.
Figure 10:
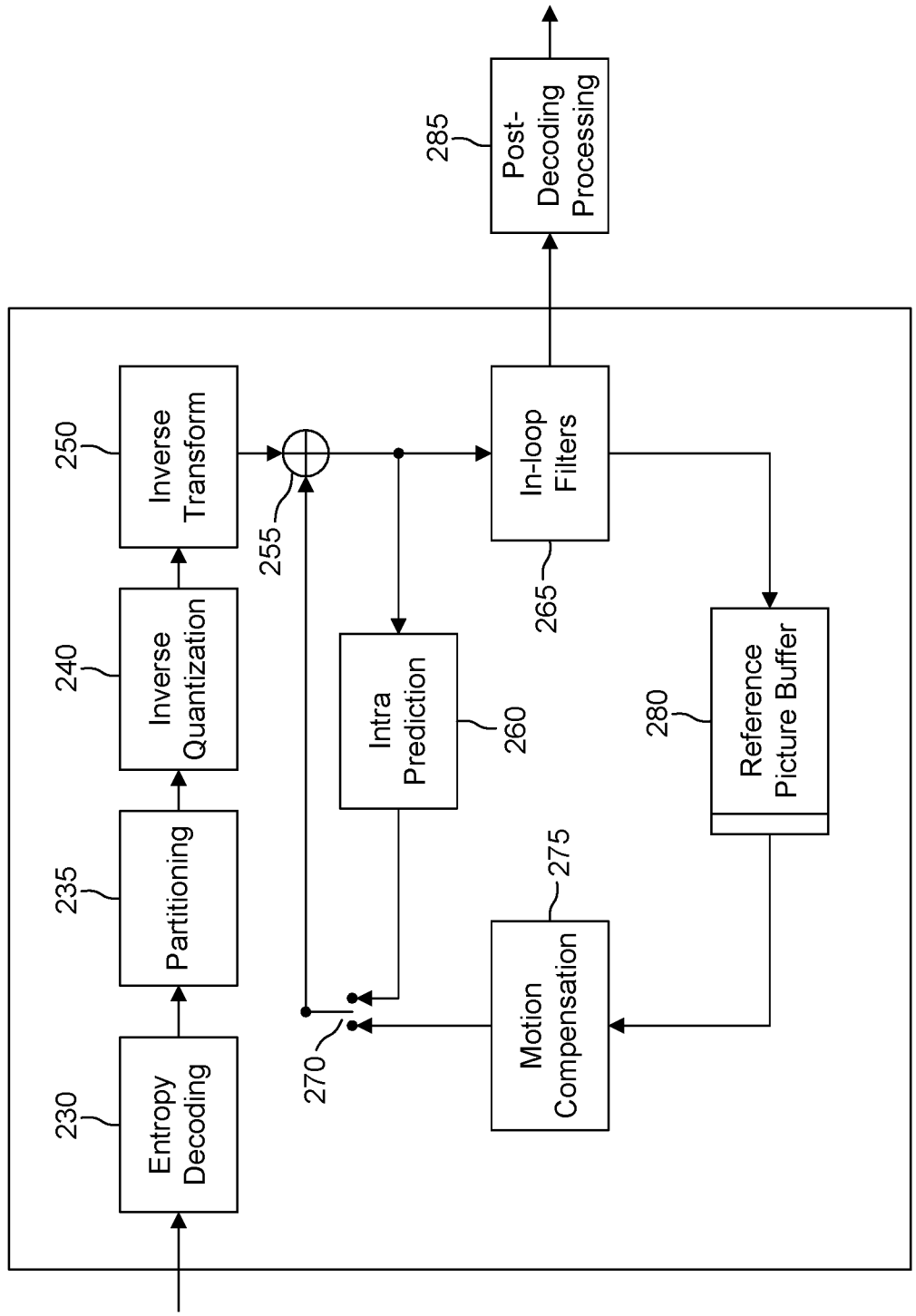
FIG. 10 shows a standard, generic video decompression scheme.
Figure 11:
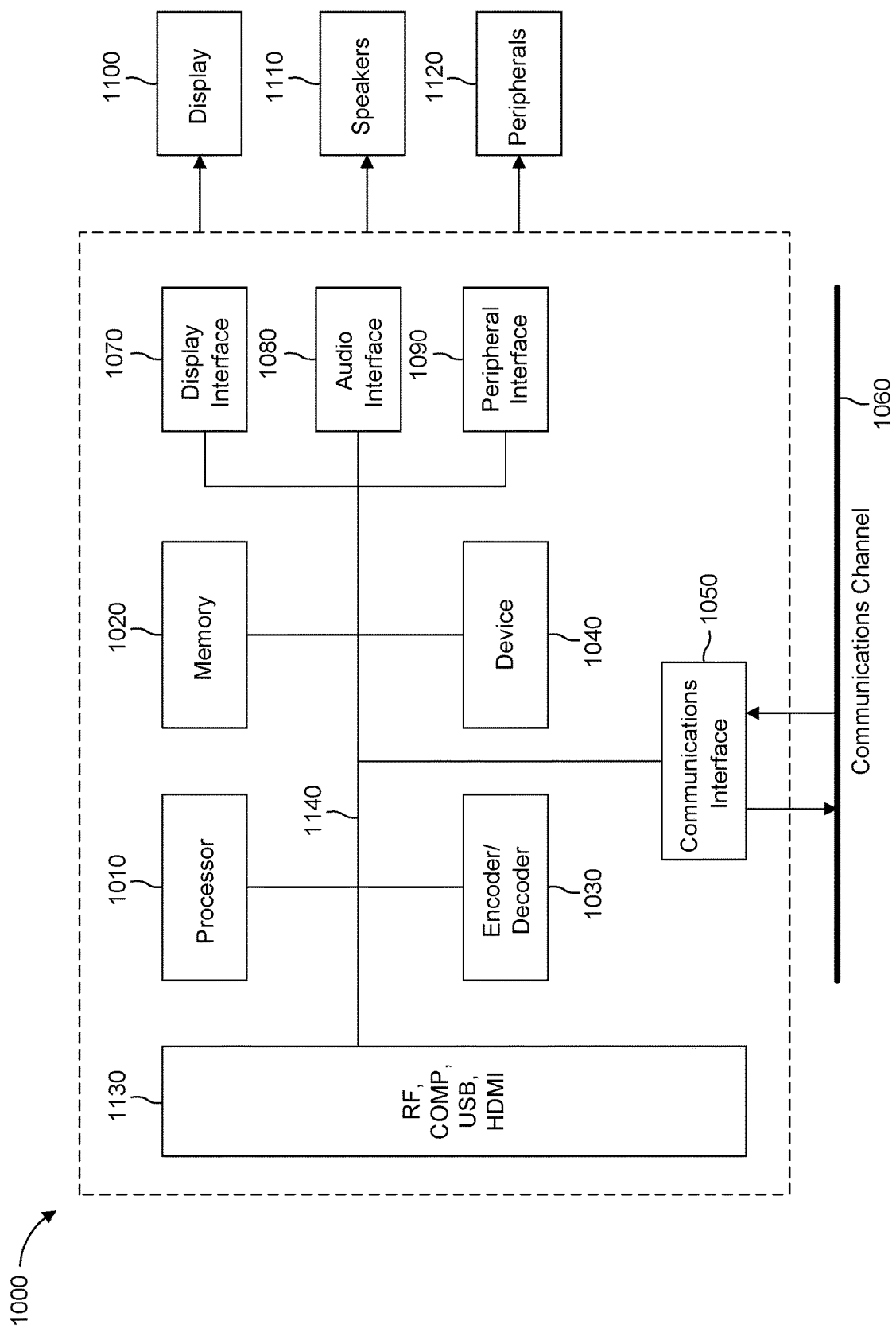
FIG. 11 shows a processor based system for encoding/decoding under the general described aspects.

The aspects described and contemplated in this application can be implemented in many different forms. FIGS. 9, 10, and 11 provide some embodiments, but other embodiments are contemplated and the discussion of FIGS. 9, 10, and 11 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 9 and FIG. 10. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 9 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 10 illustrates a block diagram of a video decoder 200. In the decoder 200, a bitstream is decoded by the decoder elements as described below. Video decoder 200 generally performs a decoding pass reciprocal to the encoding pass as described in FIG. 9. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YcbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 11 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 9, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface Ics or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The preceding sections describe a number of embodiments, across various claim categories and types. Features of these embodiments can be provided alone or in any combination. Further, embodiments can include one or more of the following features, devices, or aspects, alone or in any combination, across various claim categories and types:

Processing a bitstream from a codec in a way to adapt the bitstream for a second task.

Processing the output of a decoder to adapt it for an alternate use.

Either of the above embodiments with metadata in the bitstream or codec output.

Either of the above embodiments with metadata that instructs a device on using the bitstream for a task.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine decoding information in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
   coding a tensor comprising a video portion using a learned transform comprising a first set of constraints to generate a latent map, wherein metadata comprising trained parameters is included in said latent map;
   quantizing and entropy coding the latent map;
   entropy decoding the latent map;
   processing the entropy decoded latent map under a second set of task-specific constraints, distinct from compression-related residual constraints, the processing comprising applying a convolutional neural network trained to perform semantic or perceptual analysis of video content; and
   performing a task using the trained parameters with the processed latent map, the task comprising semantic or perceptual video processing distinct from bitstream reconstruction or residual prediction, including at least one of anomaly detection, video enhancement, object recognition, or augmented reality overlay.

2. The method of claim 1, wherein the second set of constraints comprises semantic segmentation constraints trained using pixel-level semantic labels of the video portion.

3. The method of claim 1, wherein the task comprises video super-resolution or perceptual enhancement, distinct from residual coding or entropy reconstruction.

4. The method of claim 3, wherein said processing further comprises weighting of samples.

5. The method of claim 1, wherein said processing comprises a temporal convolution across multiple consecutive frames in addition to spatial convolution across pixel locations.

6. The method of claim 1, wherein said processing comprises generating an augmented reality overlay or annotation of detected objects in the video portion.

7. The method of claim 1, wherein the second set of constraints is dynamically adapted based on feedback from the semantic or perceptual task output.

8. A non-transitory computer readable medium containing data content generated according to the method of claim 1, for playback using a processor.

9. An apparatus, comprising:
   a processor, configured to:
   code a tensor comprising a video portion using a learned transform comprising a first set of constraints to generate a latent map, wherein metadata comprising trained parameters is included in said latent map;
   quantizing and entropy coding the latent map;
   entropy decoding the latent map;
   process the entropy decoded latent map under a second set of task-specific constraints, distinct from compression-related residual constraints, the processing comprising applying a convolutional neural network trained to perform semantic or perceptual analysis; and
   perform a task using the trained parameters with the processed latent map, the task comprising semantic or perceptual video processing distinct from bitstream reconstruction or residual prediction.

10. The apparatus of claim 9, further comprising a hardware accelerator configured to execute the convolutional neural network under the second set of semantic constraints.

11. The apparatus of claim 9, wherein the processor is further configured to store in memory distinct parameter sets for compression constraints and for semantic constraints, and selectively apply said sets to the latent map.

12. The apparatus of claim 9, wherein the processor is further configured to adapt the latent map for anomaly detection in video surveillance.

13. The apparatus of claim 9, wherein the processor is further configured to output a semantically enhanced video stream distinct from a decoded reconstruction of the original video stream.

14. A method, comprising:
   decoding a video bitstream comprising a tensor comprising a video portion using a learned transform comprising a first set of constraints, wherein metadata comprising trained parameters is included in said tensor; and
   processing the decoded video bitstream with a two-dimensional convolution on each color component at each pixel location under a second set of semantic constraints, distinct from compression residual coding, the processing adapting the decoded video bitstream for a subsequent semantic or perceptual task including anomaly detection, super-resolution, video quality enhancement, or object classification.

15. A non-transitory computer program product comprising instructions which, when the program is executed by a computer, cause the computer to carry out the method of claim 14.

16. The method of claim 14, wherein said processing operates on a window of samples centered at each sample location.

17. The method of claim 14, wherein said processing further comprises object recognition using convolutional features extracted under the second set of constraints.

18. An apparatus, comprising:
   a processor, configured to:

decode a video bitstream comprising a tensor comprising a video portion using a learned transform comprising a first set of constraints, wherein metadata comprising trained parameters is included in said tensor; and process the decoded video bitstream with a two-dimensional convolution on each color component at each pixel location under a second set of semantic constraints distinct from compression residual coding, the processing adapting the decoded video bitstream for a subsequent semantic or perceptual task distinct from reconstruction or prediction coding.

19. A device comprising:

an apparatus according to claim 18; and at least one of (i) an antenna configured to receive a signal, the signal including the video block, (ii) a band limiter configured to limit the received signal to a band of frequencies that includes the video block, and (iii) a display configured to display an output representative of a video block.

20. The apparatus of claim 18, wherein said processing comprises convolution on each color component.

21. The apparatus of claim 18, wherein said processing comprises classification of video content for subsequent recommendation or retrieval tasks.

* * * * *